United States Patent [19]

Mescheryakov et al.

[11] 4,304,089
[45] Dec. 8, 1981

[54] PICKUP OF A FARM MACHINE

[76] Inventors: Ivan K. Mescheryakov, ulitsa Klubnaya, 1, kv. 27; Valery V. Markov, prospekt Selmash, 102a, kv. 31, both of Rostov-na-Donu; Igor G. Kravchenko, pereulok Bolnichny, 15, kv. 2, Zernograd Rostovskoi oblasti; Boris P. Gavrilenko, ulitsa Matrosskaya, 9, kv. 54, Rostov-na-Donu; Nikolai V. Nogin, ulitsa Shukshina, 3a, kv. 11, Zernograd Rostovskoi oblasti, all of U.S.S.R.

[21] Appl. No.: 120,296

[22] Filed: Feb. 11, 1980

[51] Int. Cl.³ ............................................. A01D 89/00
[52] U.S. Cl. ....................................... 56/364; 198/520
[58] Field of Search ........................ 198/511, 520, 519; 56/364, 15.8, 16.1

[56] References Cited

U.S. PATENT DOCUMENTS 2,347,926  5/1944  Paradise et al. ....................... 56/364
2,385,829 10/1945  Melrod .................................. 56/364
2,641,888  6/1953  Grethen ................................ 56/364
3,771,302 11/1973  Vogt ..................................... 56/364
4,178,744 12/1979  Allbly et al. ......................... 56/16.2
4,202,159  5/1980  Young ................................... 56/364

Primary Examiner—Paul J. Hirsch
Attorney, Agent, or Firm—Robert E. Burns; Emmanuel J. Lobato; Bruce L. Adams

[57] ABSTRACT

A crop pickup mechanism for a crop harvesting farm machine having an endless driven conveyor between laterally spaced rigid side members of a frame. The side members have connected thereto a forward shaft and a rear shaft mounted transversely of the frame on self-aligning bearings. A sectional crossbar is connected to the side member and is made as two rigid sections connected at a pivotal connection for relative rotation of the sections about the longitudinal axis of the crossbar. The shafts maintain the endless conveyor with substantial parallelism with ground of a field sloped in a direction transversely of the side members. The side members are thus relatively movable upwardly and downwardly as the wheels on which the frame is mounted travel over the sloped ground of the field. Crop-engaging pickup fingers on the conveyor pickup the crop being harvested for transport thereof on the conveyor.

7 Claims, 2 Drawing Figures

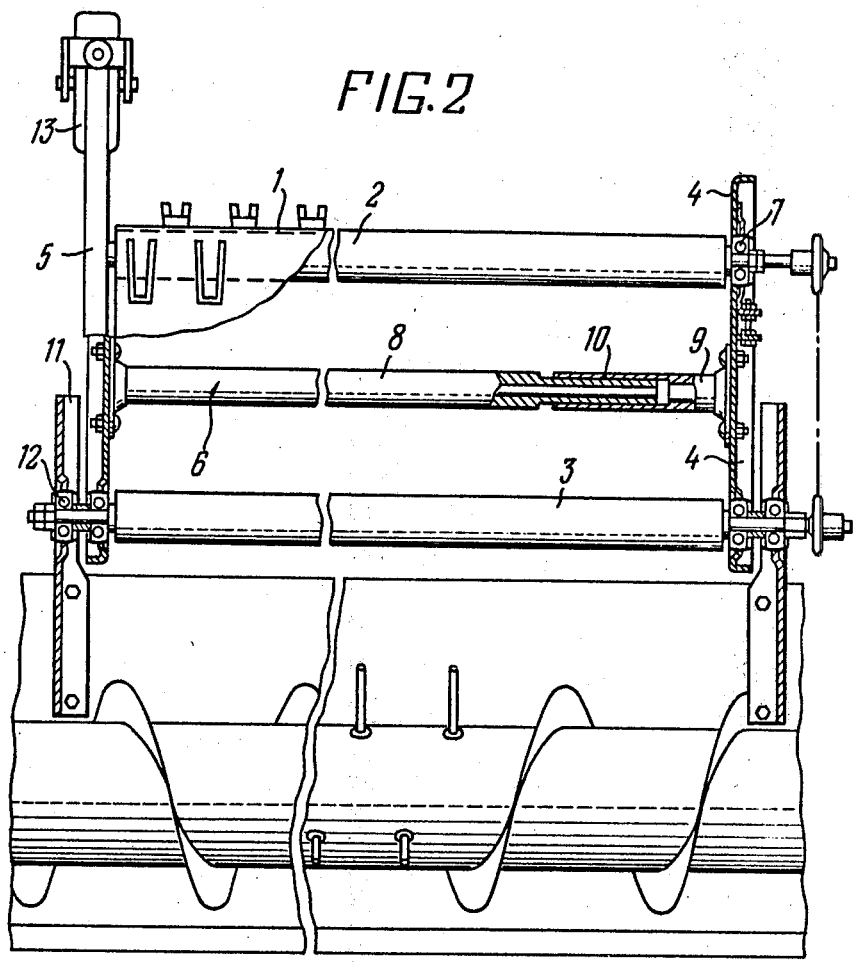

PICKUP OF A FARM MACHINE

The present invention relates to agricultural engineering and has particular reference to pickups of farm machines.

The present invention can find application in picking up from the ground various farm crops that have been mown and swathed beforehand.

A number of pickup types are known in the present state of the art, used in farm practice currently.

Known in the art are rotary rake pickups rigidly fixed on the farm machine. Inasmuch as the pickup is held in front of the machine no ability of following of the field contour by the implement is rendered possible since the gauging members (runner shoes, wheels) of the machine are situated behind the pickup. That is why such pickups have found widespread application only with grass harvesters, wherein the effective swath width is small, and the above-discussed disadvantage inherent in the pickups of this type does not therefore affect substantially the quality of the harvesting.

It is also known to use rotary rake pickups having an intermediate member, viz., a conveyer secured on a common frame with the pickup itself and adapted to transfer the picked up mass to the receptacle of the farm machine involved. The frame of said pickup is hinged to the machine which provides for good longitudinal following of the field contour. However, such pickups have found but restricted application due to complicated construction thereof.

Most extensive application for picking grain crops have heretofore been gained by conveyer-type pickups. The pickups of said type are shaped as a conveyer whose shafts are mounted in the frame side members on hinged bearing supports. To impart rigidity to the entire construction in the plane passing through the axes of the conveyer shafts the frame side members are interlinked through a crossbar which is rigidly fixed on the frame side members. The crossbar may be made of both closed rolled sections (piping) or open ones (channels). In the former case (i.e., closed sections) the frame structure features very high rigidity which precludes transverse following of the field contour, i.e., a possibility of individual movement of the side members in a vertical plane. In the latter case (i.e., open sections) a certain possibility is provided for the side members to move individually in a vertical plane and hence to follow transversely the field contour, this being due to low twisting rigidity of the channels and by virtue of the crossbar twisting within the elastic strain limits.

A disadvantage inherent in the pickups with the crossbar made of open rolled sections resides in a very narrow range of transverse following of the field contour due to restricted elastic strain limits. Another disadvantage of said pickups is the presence of reversal loads applied to the frame components (i.e., crossbar, side members, crossbar-to-side members joints), said loads being liable to cause fatigue cracks in the material of the frame components and their premature failure.

SUMMARY OF THE INVENTION

It is the main object of the present invention to reduce harvesting losses concerned with picking up the crops being harvested, due to improved transverse following of the field contour by the pickup.

It is another object of the present invention to rule out reversal loads upon the frame components, resulting from elastic strain experienced by the frame crossbar, and to extend the service life of the frame components thereby.

Said and other objects are accomplished due to the fact that a pickup of a farm machine made as a conveyer hinged-mounted on said machine and having the shafts thereof hinged to the frame side members which are interlinked through a sectional crossbar, the components of said crossbar being hinge-interconnected at the joint so as to swivel with respect to each other round the corssbar longitudinal axis.

The essence of the proposed invention consists in the following. When the transverse field contour varies the pickup support wheels locked-in with the side members of the conveyer frame change their position with respect to the farm machine involved, that is, one of the wheels rises or lowers, one of the wheels rises, while the other wheel lowers. Angular displacement of the wheels about the point of hitch of the conveyer to the machine is followed by the frame side members. Unrestricted motion of the side members and of the frame components coupled thereto is provided for due to a hinge joint located at the place of interconnection of said components and allowing the components to swivel with respect to each other round the crossbar longitudinal axis. Ability of the crossbar components to swivel round the longitudinal axis thereof does not affect adversely the rigidity of the pickup frame in the plane passing through the axes of the shafts thereof.

As a result the transverse following of the field contour by the pickup is improved which reduces harvesting losses concerned with the picking process. In addition, such a constructional arrangement of the pickup rules out any reversal loads upon the pickup frame components while following the field contour, which adds to the service durability of said frame and makes it possible to render the strength requirements imposed upon said components less strict.

BRIEF DESCRIPTION OF THE DRAWINGS

To promote understanding of the essence of the present invention appended to the disclosure thereof are the drawings of a specific exemplary embodiment of the present invention, wherein:

FIG. 2 is a plan view of the pickup showing a section taken in the plane passing through the longitudinal axes of the shafts and of the frame crossbar.

DESCRIPTION OF THE PREFERRED EMBODIMENT

Figure 1:
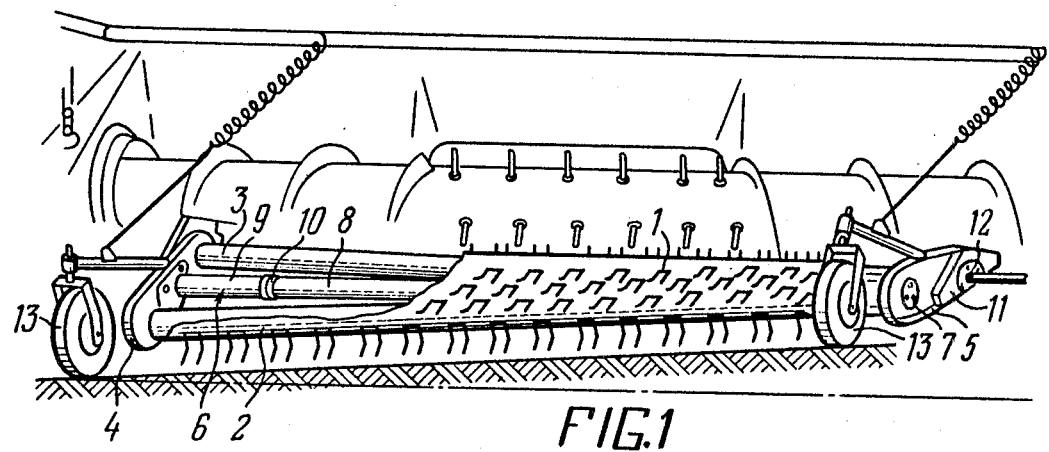
FIG. 1 is a front elevation of the pickup shown on the field where a transverse right-hand slope occurs.

The scope of the proposed invention is wider than the specific exemplary embodiment thereof given in the present disclosure to illustrate the present invention, and is defined by the claims that follow.

An endless conveyer belt 1 carrying pickup fingers, envelops parallel shafts 2 and 3 secured to side members 4 and 5 of a frame 6 on hinged-mounted bearing supports 7. The frame crossbar interconnecting the side members, is made up of two pieces 8 and 9 which establish a joint 10 when assembled together.

The pickup of the present invention is hitched to a farm machine (a grain combine in this particular case) through brackets 11, wherein the journals of the shaft 3 rest on hinge-mounted bearing supports 12. The front portion of the pickup rests upon the surface of the field through wheels 13 rigidly fixed on the frame side members 4 and 5.

While in operation the farm machine travels along the windrow of the crop being picked up in such a way that the windrow should fall within the side members 4 and 5 of the pickup frame, and that the wheels should rest upon the field surface. The pickup fingers of the conveyer belt 1 lift the windrow and transfer it to the receptacle (not shown) of the farm machine.

When the pickup rides over the field area featuring a transverse slope the pickup support wheels 13 change their position with respect to the farm machine so that the frame side members 4 and 5 swivel with respect to each other simultaneously with the wheels, thus allowing the shaft 2 to retain its parallelism to the field surface.

The present invention is instrumental in cutting down harvesting losses concerned with the picking process, adding to the service life of the pickup and can find efficient application for picking a variety of farm crops, especially in the case of complicated field contour.

What is claimed is:

1. A crop pickup mechanism for a crop harvesting farm machine comprising, laterally spaced rigid side members, travel means connected to the side members and on which the pickup mechanism travels, driven pickup conveyor means, crop-engaging pickup means on the conveyor means for picking up a crop for transporting it on the conveyor means for mounting the driven pickup conveyor means between the side members for travelling therebetween including a forward shaft extending between the side members coactive with the conveyor means for maintaining a leading portion of the pickup conveyor means inclinable to allow it to incline and maintain substantial parallelism with the ground of a field where a crop is being harvested and is sloped in a direction transversely of the side members, self-aligning bearings mounting the forward shaft on the side members, a sectional crossbar mounted and connected to the side members rearwardly of the shaft and connected thereto to maintain the side members laterally spaced and movable relatively upwardly and downwardly when the travel means move over sloped ground of said field, said crossbar comprising two rigid sections pivotal about the longitudinal axis of the crossbar, and means defining a pivotal connection between the two sections of the crossbar for relative pivotal movement around said longitudinal axis.

2. A crop pickup mechanism for a crop harvesting farm machine according to claim 1, including a rear shaft rearwardly of the crossbar, said pickup conveyor means comprising an endless conveyor driven by the forward and the rear shaft, means for driving the forward shaft and the rear shaft, and self-aligning bearings mounting the rear shaft on the side members, and all of the self-aligning bearings comprising means for allowing the side members to move relatively upwardly and downwardly while the shafts are being driven.

3. A crop pickup mechanism for a crop harvesting farm machine according to claim 1, in which said conveyor means comprises an endless conveyor.

4. A crop pickup mechanism for a crop harvesting farm machine according to claim 3, in which said endless conveyor comprises an endless belt, and in which said crop-engaging pickup means comprise fingers fixed on said endless belt.

5. A crop pickup mechanism for a crop harvesting farm machine according to claim 1, in which said travel means comprises wheels on which the crop pickup mechanism travels.

6. A crop pickup mechanism for a crop harvesting farm machine according to claim 1, in which said pivot means comprises a journal on one of said sections of the crossbar and a socket in the other section of the crossbar for receiving said journal extending axially therein.

7. A crop pickup mechanism for a crop harvesting farm machine, according to claim 1, including means for connecting the farm machine to another farm machine for pulling the first-mentioned farm machine behind it.

* * * * *